(12) United States Patent
Shah et al.

(10) Patent No.: US 12,443,362 B2
(45) Date of Patent: Oct. 14, 2025

(54) TECHNOLOGIES FOR BURST MEMORY WRITE OPERATIONS

(71) Applicant: Intel Corporation, Santa Clara, CA (US)

(72) Inventors: Setul M. Shah, Folsom, CA (US); Rajesh Sundaram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 17/357,840

(22) Filed: Jun. 24, 2021

(65) Prior Publication Data
US 2022/0413740 A1   Dec. 29, 2022

(51) Int. Cl.
*G06F 3/06* (2006.01)

(52) U.S. Cl.
CPC .......... *G06F 3/0655* (2013.01); *G06F 3/0611* (2013.01); *G06F 3/0673* (2013.01)

(58) Field of Classification Search
CPC .... G06F 3/0655; G06F 3/0611; G06F 3/0673; G06F 3/0625; G06F 3/0629; G06F 3/0644; G06F 3/0658; G11C 7/22; G11C 2213/76; G11C 2213/77; G11C 13/0026; G11C 13/0028; G11C 13/003; G11C 13/0069; G11C 13/0004; G11C 7/1018; G11C 13/004

USPC ........................................................ 711/154
See application file for complete search history.

(56) References Cited

U.S. PATENT DOCUMENTS

| | | |
|---|---|---|
| 2016/0357456 A1 | 12/2016 | Iwasaki |
| 2017/0092366 A1* | 3/2017 | Hwang ................. G06F 3/0616 |
| 2017/0263316 A1 | 9/2017 | Shimizu |
| 2017/0308296 A1 | 10/2017 | Lesartre et al. |
| 2018/0024779 A1 | 1/2018 | Kojima |
| 2021/0089219 A1* | 3/2021 | Pahwa ................. G06F 12/0246 |
| 2021/0223994 A1* | 7/2021 | Kanno ................. G06F 3/0679 |

OTHER PUBLICATIONS

EPO; Extended European Search Report issued in EP Patent Application No. 22163142.7, dated Sep. 9, 2022; 10 pages.

* cited by examiner

*Primary Examiner* — Hua J Song
(74) *Attorney, Agent, or Firm* — Alliance IP, LLC

(57) ABSTRACT

Techniques for burst memory write operations are disclosed. In the illustrative embodiment, a memory die is limited in how quickly it can perform memory write operations that it receives from a microcontroller due to thermal constraints. The memory die can mitigate the need for the microcontroller to perform a costly rank switch to send an operation to another die by buffering memory write operations. The microcontroller can then send several consecutive memory write operations to a first memory die before switching to a second memory die. The first memory die can then perform the memory write operations while the microcontroller has moved on to other memory operations.

20 Claims, 9 Drawing Sheets

Table 1 (Time Slots 0-11)

| | 0 | 1 | 2 | 3 | 4 | 5 | 6 | 7 | 8 | 9 | 10 | 11 |
|---|---|---|---|---|---|---|---|---|---|---|---|---|
| Command bus | Die 1 Write 1 | Die 1 Write 2 | Die 1 Write 4 | Die 1 Read 1 | Die 1 Read 2 | Die 1 Read 3 | Die 1 Read 4 | Die 2 Write 1 | Die 2 Write 2 | Die 2 Write 3 | Die 2 Write 4 | |
| Command to partitions | Die 1 Write 1 | Die 1 Write 2 | | Die 1 Write 3 | | Die 1 Write 4 | | | | | | |
| Command to partitions | | | | Die 1 Read 1 | Die 1 Read 2 | Die 1 Read 3 | Die 1 Read 4 | Die 2 Write 1 | | | | |
| Data bus | | Die 1 Write 1 | Die 1 Write 2 | Die 1 Write 4 | Die 1 Write 4 | Die 1 Read 1 | Die 1 Read 2 | Die 1 Read 3 | Die 1 Read 4 | Die 2 Write 2 | Die 2 Write 1 | |
| Data to partitions | | Die 1 Write 1 | | Die 1 Write 2 | | Die 1 Write 3 | Die 1 Write 4 | | | | | |
| Data to partitions | | | | | | | | | | Die 2 Write 1 | | |
| Time Slot | 0 | 1 | 2 | 3 | 4 | 5 | 6 | 7 | 8 | 9 | 10 | 11 |

Table 2 (Time Slots 12-20)

| | 12 | 13 | 14 | 15 | 16 | 17 | 18 | 19 | 20 |
|---|---|---|---|---|---|---|---|---|---|
| Command bus | Die 2 Read 1 | Die 2 Read 2 | Die 2 Read 3 | Die 4 Read 4 | Die 1 Write 5 | Die 1 Write 6 | | | |
| Command to partitions | Die 2 Read 1 | Die 2 Read 2 | Die 2 Read 3 | Die 4 Read 4 | Die 1 Write 5 | Die 1 Write 6 | | | |
| Command to partitions | Die 2 Write 3 | | Die 2 Write 4 | | | | | | |
| Data bus | Die 2 Write 3 | Die 2 Write 4 | Die 2 Read 1 | Die 2 Read 2 | Die 2 Read 3 | Die 4 Read 4 | Die 1 Write 5 | Die 1 Write 6 | |
| Data to partitions | | | | | | | Die 1 Write 5 | | |
| Data to partitions | Die 2 Write 2 | | Die 2 Write 3 | | Die 2 Write 4 | | Die 1 Write 5 | Die 1 Write 6 | |
| Time Slot | 12 | 13 | 14 | 15 | 16 | 17 | 18 | 19 | 20 |

FIG. 8

| | 0 | 1 | 2 | 3 | 4 | 5 | 6 | 7 | 8 | 9 | 10 | 11 |
|---|---|---|---|---|---|---|---|---|---|---|---|---|
| Command bus | Die 1 Write 1 | Die 1 Write 2 | Die 1 Write 3 | Die 1 Write 4 | Die 2 Write 1 | Die 2 Write 2 | Die 2 Write 3 | Die 1 Write 5 | Die 1 Write 6 | Die 1 Write 7 | Die 1 Write 8 | |
| Command to partitions | Die 1 Write 1 | Die 1 Write 2 | | Die 1 Write 3 | | Die 1 Write 4 | | Die 1 Write 5 | | Die 1 Write 6 | | |
| Command to partitions | | | | | | | | Die 2 Write 1 | Die 2 Write 2 | | | |
| Data bus | | Die 1 Write 1 | Die 1 Write 2 | Die 1 Write 3 | Die 1 Write 4 | Die 1 Write 5 | Die 2 Write 1 | Die 2 Write 2 | Die 2 Write 3 | Die 2 Write 4 | Die 1 Write 5 | Die 1 Write 6 |
| Data to partitions | | Die 1 Write 1 | | Die 1 Write 2 | | Die 1 Write 3 | | Die 2 Write 4 | | Die 1 Write 5 | | |
| Data to partitions | | | | | | | Die 2 Write 1 | Die 2 Write 2 | Die 2 Write 3 | | | |
| Time Slot | 0 | 1 | 2 | 3 | 4 | 5 | 6 | 7 | 8 | 9 | 10 | 11 |

| | 12 | 13 | 14 | 15 | 16 | 17 | 18 | 19 | 20 |
|---|---|---|---|---|---|---|---|---|---|
| Command bus | Die 2 Write 5 | Die 2 Write 6 | Die 2 Write 7 | Die 2 Write 8 | | | | | |
| Command to partitions | Die 1 Write 7 | Die 1 Write 8 | Die 1 Write 8 | | Die 2 Write 7 | | Die 2 Write 8 | | |
| Command to partitions | Die 2 Write 5 | | Die 2 Write 6 | | | | | | |
| Data bus | Die 1 Write 7 | Die 1 Write 8 | Die 2 Write 5 | Die 2 Write 6 | Die 2 Write 7 | Die 2 Write 7 | Die 2 Write 8 | | |
| Data to partitions | Die 1 Write 6 | | Die 1 Write 7 | | Die 1 Write 8 | | | | |
| Data to partitions | Die 2 Write 4 | | Die 2 Write 5 | | Die 2 Write 6 | | Die 2 Write 7 | | Die 2 Write 8 |
| Time Slot | 12 | 13 | 14 | 15 | 16 | 17 | 18 | 19 | 20 |

FIG. 9

TECHNOLOGIES FOR BURST MEMORY WRITE OPERATIONS

BACKGROUND

In some memory types, such as phase-change-based memory, write operations may use a lot of energy, limiting the frequency of memory write operations. In some cases, a data rate that a memory die can accept is limited by the frequency of memory write operations. In order to mitigate the effect of such a limit, a microcontroller may change ranks or change dies in between memory write operations in order to avoid the limit set by the frequency of memory write operations. In order to change ranks or change dies, in some embodiments, the microcontroller may need to perform rank switching tasks before sending memory operations to the new rank or die.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 8 is a simplified timing diagram of at least one embodiment for performing memory operations.

FIG. 9 is a simplified timing diagram of at least one embodiment for performing memory operations.

DETAILED DESCRIPTION OF THE DRAWINGS

Figure 5:
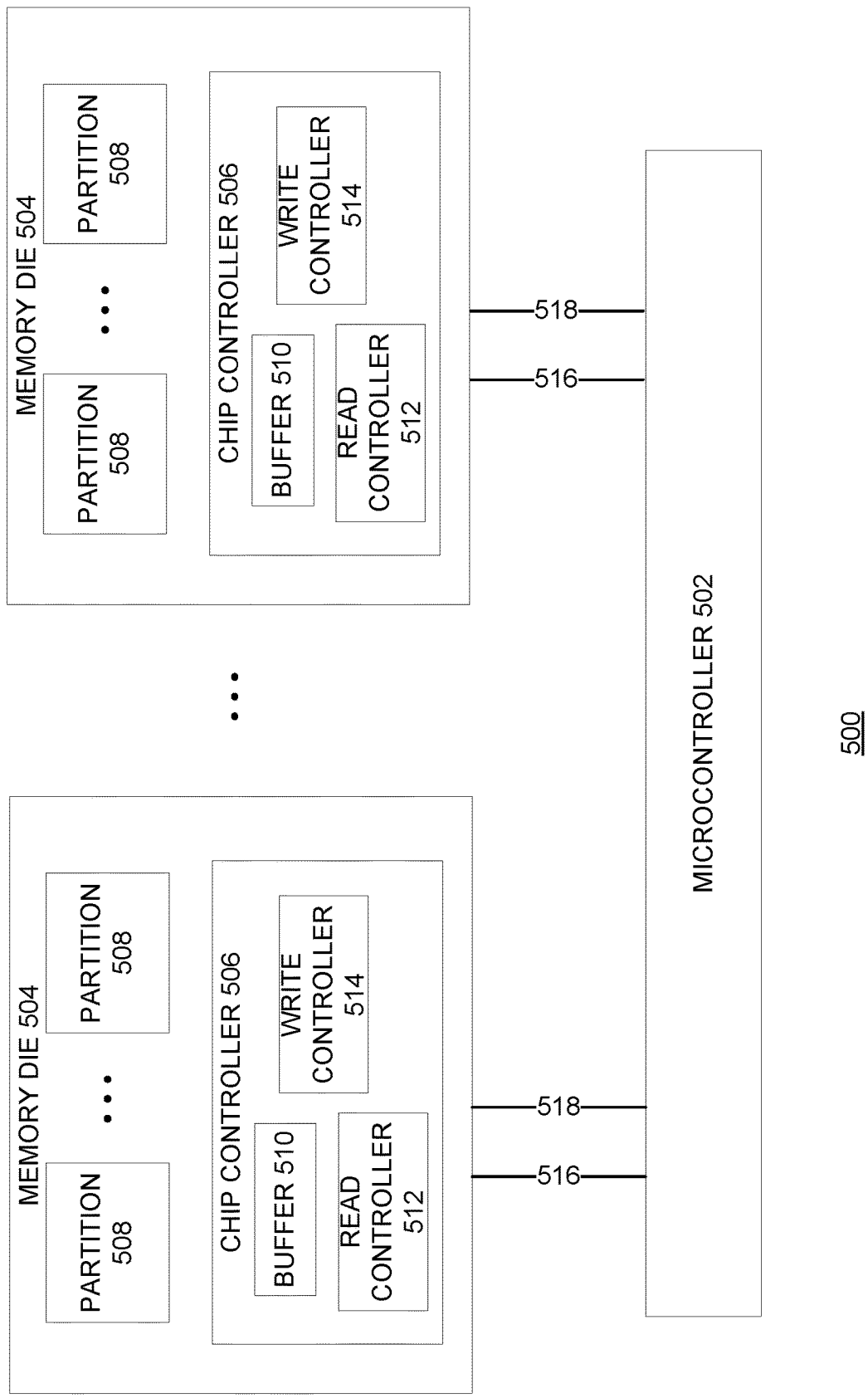
FIG. 5 illustrates components of a computer system in accordance with certain embodiments.

In the illustrative embodiment, a memory die (such as memory die 504 in FIG. 5) has a buffer (such as buffer 510 in memory die 504) that can buffer memory write operations received from a microcontroller (such as microcontroller 502 in FIG. 5). The memory die 504 can space the memory write operations out by a required spacing, which complies with the power limits on the memory die 504. Because the memory die 504 can buffer memory write operations, the microcontroller 502 can send multiple consecutive or burst write operations to the memory die 504 at the maximum command rate before the microcontroller 502 switches to a new rank or memory die 504, which has a time cost associated with it. As the microcontroller 502 does not need to switch rank or die 504 for each write operation, the efficiency of memory operations is increased.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Although the drawings depict particular computer systems, the concepts of various embodiments are applicable to any suitable computer systems. Examples of systems in which teachings of the present disclosure may be used include desktop computer systems, server computer systems, storage systems, handheld devices, tablets, other thin notebooks, system on a chip (SOC) devices, and embedded applications. Some examples of handheld devices include cellular phones, digital cameras, media players, personal digital assistants (PDAs), and handheld PCs. Embedded applications may include microcontrollers, digital signal processors (DSPs), SOCs, network computers (NetPCs), set-top boxes, network hubs, wide area networks (WANs) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising one or more computing devices.

Figure 1:
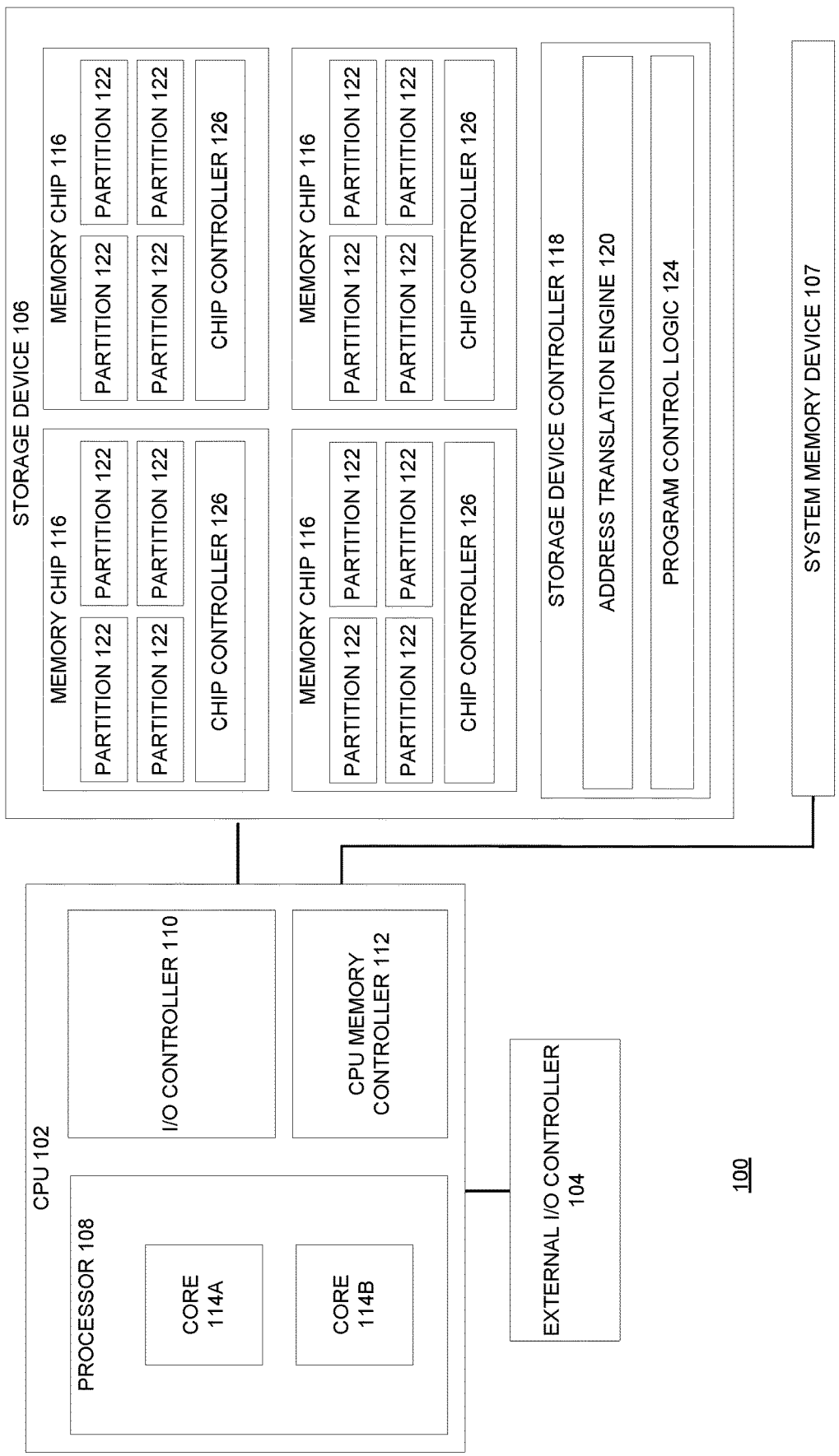
FIG. 1 illustrates components of a computer system in accordance with certain embodiments.

FIG. 1 illustrates components of a computer system 100 in accordance with certain embodiments. System 100 includes a central processing unit (CPU) 102 coupled to an external input/output (I/O) controller 104, a storage device 106 such as a solid state drive (SSD), and system memory device 107. During operation, data may be transferred between a storage device 106 and/or system memory device 107 and the CPU 102. In various embodiments, particular memory access operations (e.g., read and write operations) involving a storage device 106 or system memory device 107 may be issued by an operating system and/or other software applications executed by processor 108. In various embodiments, a storage device 106 may include a storage device controller 118 and one or more memory chips 116 that each comprise any suitable number of memory partitions 122.

In various embodiments, a memory partition 122 may include a 3D crosspoint memory array. In some embodiments, a 3D crosspoint memory array may comprise a transistor-less (e.g., at least with respect to the data storage elements of the memory) stackable crosspoint architecture in which memory cells sit at the intersection of row address lines and column address lines arranged in a grid.

CPU 102 comprises a processor 108, such as a microprocessor, an embedded processor, a digital signal processor (DSP), a network processor, a handheld processor, an application processor, a co-processor, an SOC, or other device to execute code (e.g., software instructions). Processor 108, in the depicted embodiment, includes two processing elements (cores 114A and 114B in the depicted embodiment), which may include asymmetric processing elements or symmetric processing elements. However, a processor may include any number of processing elements that may be symmetric or asymmetric. CPU 102 may be referred to herein as a host computing device (though a host computing device may be any suitable computing device operable to issue memory access commands to a storage device 106).

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 (e.g., 114A or 114B) may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is an integrated I/O controller that includes logic for communicating data between CPU 102 and I/O devices. In other embodiments, the I/O controller 110 may be on a different chip from the CPU 102. I/O devices may refer to any suitable devices capable of transferring data to and/or receiving data from an electronic system, such as CPU 102. For example, an I/O device may comprise an audio/video (A/V) device controller such as a graphics accelerator or audio controller; a data storage device controller, such as a magnetic storage disk or optical storage disk controller; a wireless transceiver; a network processor; a network interface controller; or a controller for another input device such as a monitor, printer, mouse, keyboard, or scanner; or other suitable device. In a particular embodiment, an I/O device may comprise a storage device 106 coupled to the CPU 102 through I/O controller 110.

An I/O device may communicate with the I/O controller 110 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 110 and an associated I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 110 may be located off-chip (e.g., not on the same chip as CPU 102) or may be integrated on the same chip as the CPU 102.

CPU memory controller 112 is an integrated memory controller that controls the flow of data going to and from one or more system memory devices 107. CPU memory controller 112 may include logic operable to read from a system memory device 107, write to a system memory device 107, or to request other operations from a system memory device 107. In various embodiments, CPU memory controller 112 may receive write requests from cores 114 and/or I/O controller 110 and may provide data specified in these requests to a system memory device 107 for storage therein. CPU memory controller 112 may also read data from a system memory device 107 and provide the read data to I/O controller 110 or a core 114. During operation, CPU memory controller 112 may issue commands including one or more addresses of the system memory device 107 in order to read data from or write data to memory (or to perform other operations). In some embodiments, CPU memory controller 112 may be implemented on the same chip as CPU 102, whereas in other embodiments, CPU memory controller 112 may be implemented on a different chip than that of CPU 102. I/O controller 110 may perform similar operations with respect to one or more storage devices 106.

The CPU 102 may also be coupled to one or more other I/O devices through external I/O controller 104. In a particular embodiment, external I/O controller 104 may couple a storage device 106 to the CPU 102. External I/O controller 104 may include logic to manage the flow of data between one or more CPUs 102 and I/O devices. In particular embodiments, external I/O controller 104 is located on a motherboard along with the CPU 102. The external I/O controller 104 may exchange information with components of CPU 102 using point-to-point or other interfaces.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store temporary data, persistent data (e.g., a user's files or instruction sequences) that maintains its state even after power to the system memory device 107 is removed, or a combination thereof. A system memory device 107 may be dedicated to a particular CPU 102 or shared with other devices (e.g., one or more other processors or other devices) of computer system 100.

In various embodiments, a system memory device 107 may include a memory comprising any number of memory partitions, a memory device controller, and other supporting logic (not shown). A memory partition may include non-volatile memory and/or volatile memory.

Non-volatile memory is a storage medium that does not require power to maintain the state of data stored by the medium, thus non-volatile memory may have a determinate state even if power is interrupted to the device housing the memory. Nonlimiting examples of nonvolatile memory may include any or a combination of: 3D crosspoint memory, phase change memory (e.g., memory that uses a chalcogenide glass phase change material in the memory cells), ferroelectric memory, silicon-oxide-nitride-oxide-silicon (SONOS) memory, polymer memory (e.g., ferroelectric polymer memory), ferroelectric transistor random access memory (Fe-TRAM) ovonic memory, anti-ferroelectric memory, nanowire memory, electrically erasable programmable read-only memory (EEPROM), a memristor, single or multi-level phase change memory (PCM), Spin Hall Effect Magnetic RAM (SHE-MRAM), and Spin Transfer Torque Magnetic RAM (STTRAM), a resistive memory, magnetoresistive random access memory (MRAM) memory that incorporates memristor technology, resistive memory including the metal oxide base, the oxygen vacancy base and the conductive bridge Random Access Memory (CB-RAM), a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory.

Volatile memory is a storage medium that requires power to maintain the state of data stored by the medium (thus volatile memory is memory whose state (and therefore the data stored on it) is indeterminate if power is interrupted to the device housing the memory). Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, JESD79-4 initial specification published in September 2012 by JEDEC), DDR4E (DDR version 4, extended, currently in discussion by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5, originally published by JEDEC in January 2020, HBM2 (HBM version 2), originally published by JEDEC in January 2020, or others or combinations of memory technologies, and technologies based on derivatives or extensions of such specifications.

A storage device 106 may store any suitable data, such as data used by processor 108 to provide functionality of computer system 100. For example, data associated with programs that are executed or files accessed by cores 114A and 114B may be stored in storage device 106. Thus, in some embodiments, a storage device 106 may store data and/or sequences of instructions that are executed or otherwise used by the cores 114A and 114B. In various embodiments, a storage device 106 may store persistent data (e.g., a user's files or software application code) that maintains its state even after power to the storage device 106 is removed. A storage device 106 may be dedicated to CPU 102 or shared with other devices (e.g., another CPU or other device) of computer system 100.

In the embodiment depicted, storage device 106 includes a storage device controller 118 and four memory chips 116 each comprising four memory partitions 122 operable to store data, however, a storage device may include any suitable number of memory chips each having any suitable number of memory partitions. A memory partition 122 includes a plurality of memory cells operable to store data. The cells of a memory partition 122 may be arranged in any suitable fashion, such as in rows (e.g., wordlines) and columns (e.g., bitlines), three dimensional structures, sectors, or in other ways. In various embodiments, the cells may be logically grouped into banks, blocks, subblocks, wordlines, pages, frames, bytes, slices, or other suitable groups. In various embodiments, a memory partition 122 may include any of the volatile or non-volatile memories listed above or other suitable memory. In a particular embodiment, each memory partition 122 comprises one or more 3D crosspoint memory arrays. 3D crosspoint arrays are described in more detail in connection with the following figures.

In various embodiments, storage device 106 may comprise a disk drive (e.g., a solid state drive); a memory card; a Universal Serial Bus (USB) drive; a Dual In-line Memory Module (DIMM), such as a Non-Volatile DIMM (NVDIMM); storage integrated within a device such as a smartphone, camera, or media player; or other suitable mass storage device.

In a particular embodiment, one or more memory chips 116 are embodied in a semiconductor package. In various embodiments, a semiconductor package may comprise a casing comprising one or more semiconductor chips (also referred to as dies). A package may also comprise contact pins or leads used to connect to external circuits. In various embodiments, a memory chip may include one or more memory partitions 122.

Accordingly, in some embodiments, storage device 106 may comprise a package that includes a plurality of chips that each include one or more memory partitions 122. However, a storage device 106 may include any suitable arrangement of one or more memory partitions and associated logic in any suitable physical arrangement. For example, memory partitions 122 may be embodied in one or more different physical mediums, such as a circuit board, semiconductor package, semiconductor chip, disk drive, other medium, or any combination thereof.

System memory device 107 and storage device 106 may comprise any suitable types of memory and are not limited to a particular speed, technology, or form factor of memory in various embodiments. For example, a storage device 106 may be a disk drive (such as a solid-state drive), memory integrated with a computing device (e.g., memory integrated on a circuit board of the computing device), a memory module (e.g., a dual in-line memory module) that may be inserted in a memory socket, or other type of storage device. Similarly, system memory 107 may have any suitable form factor. Moreover, computer system 100 may include multiple different types of storage devices.

System memory device 107 or storage device 106 may include any suitable interface to communicate with CPU memory controller 112 or I/O controller 110 using any suitable communication protocol such as a DDR-based protocol, PCI, PCIe, USB, SAS, SATA, FC, System Management Bus (SMBus), or other suitable protocol. In some embodiments, a system memory device 107 or storage device 106 may also include a communication interface to communicate with CPU memory controller 112 or I/O controller 110 in accordance with any suitable logical device interface specification such as NVMe, AHCI, or other suitable specification. In particular embodiments, system memory device 107 or storage device 106 may comprise multiple communication interfaces that each communicate using a separate protocol with CPU memory controller 112 and/or I/O controller 110.

Storage device controller 118 may include logic to receive requests from CPU 102 (e.g., via an interface that communicates with CPU memory controller 112 or I/O controller 110), cause the requests to be carried out with respect to the memory chips 116, and provide data associated with the requests to CPU 102 (e.g., via CPU memory controller 112 or I/O controller 110). Storage device controller 118 may also be operable to detect and/or correct errors encountered during memory operations via an error correction code (ECC engine). In various embodiments, controller 118 may also monitor various characteristics of the storage device 106 such as the temperature or voltage and report associated statistics to the CPU 102. Storage device controller 118 can be implemented on the same circuit board or device as the memory chips 116 or on a different circuit board or device. For example, in some environments, storage device controller 118 may be a centralized storage controller that manages memory operations for multiple different storage devices 106 of computer system 100.

In various embodiments, the storage device 106 also includes program control logic 124 which is operable to control the programming sequence performed when data is written to or read from a memory chip 116. In various embodiments, program control logic 124 may provide the various voltages (or information indicating which voltages should be provided) that are applied to memory cells during the programming and/or reading of data (or perform other operations associated with read or program operations), perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 described herein may be located on a memory chip 116. In various embodiments, reference herein to a "controller" may refer to any suitable control logic, such as storage device controller 118, chip controller 126, or a partition controller. In some embodiments, reference to a controller may contemplate logic distributed on multiple components, such as logic of a storage device controller 118, chip controller 126, and/or a partition controller.

In various embodiments, storage device controller 118 may receive a command from a host device (e.g., CPU 102), determine a target memory chip for the command, and communicate the command to a chip controller 126 of the target memory chip. In some embodiments, the storage device controller 118 may modify the command before sending the command to the chip controller 126.

The chip controller 126 may receive a command from the storage device controller 118 and determine a target memory partition 122 for the command. The chip controller 126 may then send the command to a controller of the determined memory partition 122. In various embodiments, the chip controller 126 may modify the command before sending the command to the controller of the partition 122.

In some embodiments, all or some of the elements of system 100 are resident on (or coupled to) the same circuit board (e.g., a motherboard). In various embodiments, any suitable partitioning between the elements may exist. For example, the elements depicted in CPU 102 may be located on a single die (e.g., on-chip) or package or any of the elements of CPU 102 may be located off-chip or off-package. Similarly, the elements depicted in storage device 106 may be located on a single chip or on multiple chips. In various embodiments, a storage device 106 and a computing host (e.g., CPU 102) may be located on the same circuit board or on the same device and in other embodiments the storage device 106 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 100, such as cores 114, one or more CPU memory controllers 112, I/O controller 110, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and the storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 2:
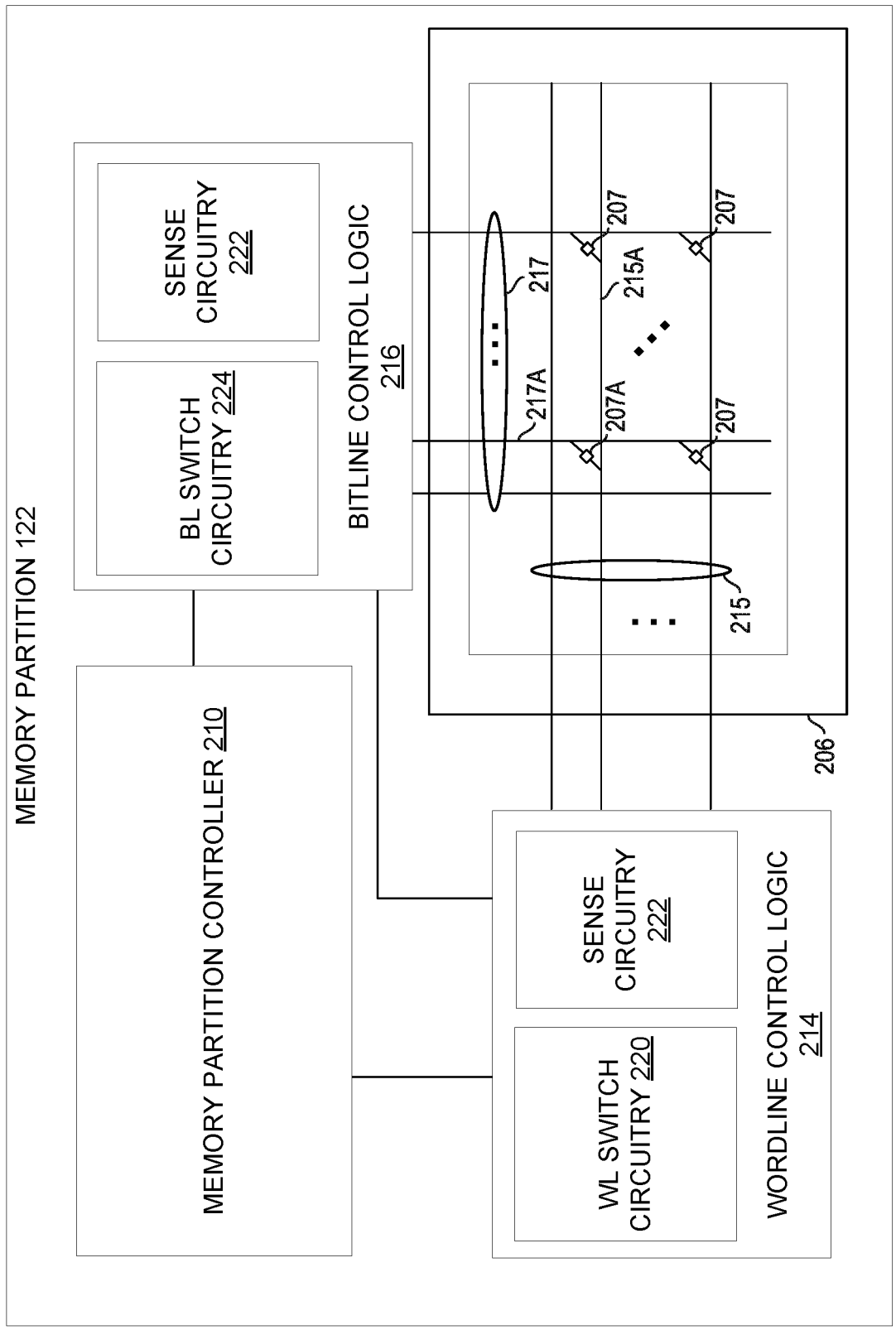
FIG. 2 illustrates a memory partition in accordance with certain embodiments.

FIG. 2 illustrates a detailed exemplary view of the memory partition 122 of FIG. 1 in accordance with certain embodiments. In one embodiment, a memory partition 122 may include 3D crosspoint memory which may include phase change memory or other suitable memory types. In some embodiments, a 3D crosspoint memory array 206 may comprise a transistor-less (e.g., at least with respect to the data storage elements of the memory) stackable crosspoint architecture in which memory cells 207 sit at the intersection of row address lines and column address lines arranged in a grid. The row address lines 215 and column address lines 217, called wordlines (WLs) and bitlines (BLs), respectively, cross in the formation of the grid and each memory cell 207 is coupled between a WL and a BL where the WL and BL cross (e.g., at a crosspoint). At the point of a crossing, the WL and BL may be located at different vertical planes such that the WL crosses over the BL but does not physically touch the BL. As described above, the architecture may be stackable, such that a wordline may cross over a bitline located beneath the wordline and another bitline for another memory cell located above the wordline. It should be noted that row and column are terms of convenience used to provide a qualitative description of the arrangement of WLs and BLs in crosspoint memory. In various embodiments, the cells of the 3D crosspoint memory array may be individually addressable. In some embodiments, bit storage may be based on a change in bulk resistance of a 3D crosspoint memory cell.

FIG. 2 illustrates a memory partition in accordance with certain embodiments. In the embodiment of FIG. 2, a memory partition 122 includes memory partition controller 210, wordline control logic 214, bitline control logic 216, and memory array 206. A host device (e.g., CPU 102) may provide read and/or write commands including memory address(es) and/or associated data to memory partition 122 (e.g., via storage device controller 118 and chip controller 126) and may receive read data from memory partition 122 (e.g., via the chip controller 126 and storage device controller 118). Similarly, storage device controller 118 may provide host-initiated read and write commands or device-initiated read and write commands including memory addresses to memory partition 122 (e.g., via chip controller 126). Memory partition controller 210 (in conjunction with wordline control logic 214 and bitline control logic 216) is configured to perform memory access operations, e.g., reading one or more target memory cells and/or writing to one or more target memory cells.

Memory array 206 corresponds to at least a portion of a 3D crosspoint memory (e.g., that may include phase change memory cells or other suitable memory cells) and includes a plurality of wordlines 215, a plurality of bitlines 217 and a plurality of memory cells, e.g., memory cells 207. Each memory cell is coupled between a wordline ("WL") and a bitline ("BL") at a crosspoint of the WL and the BL.

Memory partition controller 210 may manage communications with chip controller 126 and/or storage device controller 118. In a particular embodiment, memory partition controller 210 may analyze one or more signals received from another controller to determine whether a command sent via a bus is to be consumed by the memory partition 122. For example, controller 210 may analyze an address of the command and/or a value on an enable signal line to determine whether the command applies to the memory partition 122. Controller 210 may be configured to identify one or more target WLs and/or BLs associated with a received memory address (this memory address may be a separate address from the memory partition address that identifies the memory partition 122, although in some embodiments a portion of an address field of a command may identify the memory partition while another portion of the address field may identify one or more WLs and/or BLs). Memory partition controller 210 may be configured to manage operations of WL control logic 214 and BL control logic 216 based, at least in part, on WL and/or BL identifiers included in a received command. Memory partition controller 210 may include memory partition controller circuitry 211, and a memory controller interface 213. Memory controller interface 213, although shown as a single block in FIG. 2, may include a plurality of interfaces, for example a separate interface for each of the WL control logic 214 and the BL control logic 216.

WL control logic 214 includes WL switch circuitry 220 and sense circuitry 222. WL control logic 214 is configured to receive target WL address(es) from memory partition controller 210 and to select one or more WLs for reading and/or writing operations. For example, WL control logic 214 may be configured to select a target WL by coupling a WL select bias voltage to the target WL. WL control logic 214 may be configured to deselect a WL by decoupling the target WL from the WL select bias voltage and/or by coupling a WL deselect bias voltage (e.g., a neutral bias voltage) to the WL. WL control logic 214 may be coupled to a plurality of WLs 215 included in memory array 206. Each WL may be coupled to a number of memory cells corresponding to a number of BLs 217. WL switch circuitry 220 may include a plurality of switches, each switch configured to couple (or decouple) a respective WL, e.g., WL 215A, to a WL select bias voltage to select the respective WL 215A.

BL control logic 216 includes BL switch circuitry 224. In some embodiments, BL control logic 216 may also include sense circuitry, e.g., sense circuitry 222. BL control logic 216 is configured to select one or more BLs for reading and/or writing operations. BL control logic 216 may be configured to select a target BL by coupling a BL select bias voltage to the target BL. BL control logic 216 may be configured to deselect a BL by decoupling the target BL from the BL select bias voltage and/or by coupling a BL deselect bias voltage (e.g., a neutral bias voltage) to the BL. BL switch circuitry 224 is similar to WL switch circuitry 220 except BL switch circuitry 224 is configured to couple the BL select bias voltage to a target BL.

Sense circuitry 222 is configured to detect the state of one or more sensed memory cells 207 (e.g., via the presence or absence of a snap back event during a sense interval), e.g., during a read operation. Sense circuitry 222 is configured to provide a logic level output related to the result of the read operation to, e.g., memory partition controller 210.

As an example, in response to a signal from memory partition controller 210, WL control logic 214 and BL control logic 216 may be configured to select a target memory cell, e.g., memory cell 207A, for a read operation by coupling WL 215A to WL select bias voltage and BL 217A to BL select bias voltage as well as coupling the other WLs and BLs to respective deselect bias voltages. One or both of sense circuitries 222 may then be configured to monitor WL 215A and/or BL 217A for a sensing interval in order to determine the state of the memory cell 207A.

Thus, WL control logic 214 and/or BL control logic 216 may be configured to select a target memory cell for a read operation, initiate the read operation, sense the selected memory cell (e.g., for a snap back event) in a sensing interval, and provide the result of the sensing to, e.g., memory partition controller 210.

In a particular embodiment, the sense circuitry 222 may include a WL load connected to a WL electrode or gate, and a BL load connected to a BL electrode or gate. When a particular wordline and bitline are selected in the array, a difference between WL load or WL voltage and the BL voltage corresponds to a read VDM. VDM may induce a current ($i_{cell}$) in the memory cell 207A dependent on a program state of the memory cell. A comparator such as a sense amplifier may compare $i_{cell}$ with a reference current in order to read a logic state of the memory cell. In this manner, an output of the sense amplifier/comparator may be indicative of a state of the target memory cell. A latch may be coupled to the output of the comparator to store the output of the read operation.

For each matrix of arrays, there may be a number of sense amplifiers provided, with the sense circuitry 222 able to process up to a maximum number of sensed bits, such as 128 bits, from the sense amplifiers at one time. Hence, in one embodiment, 128 memory cells may be sensed at one time by sense amplifiers of the sense circuitry 222.

Figure 3:
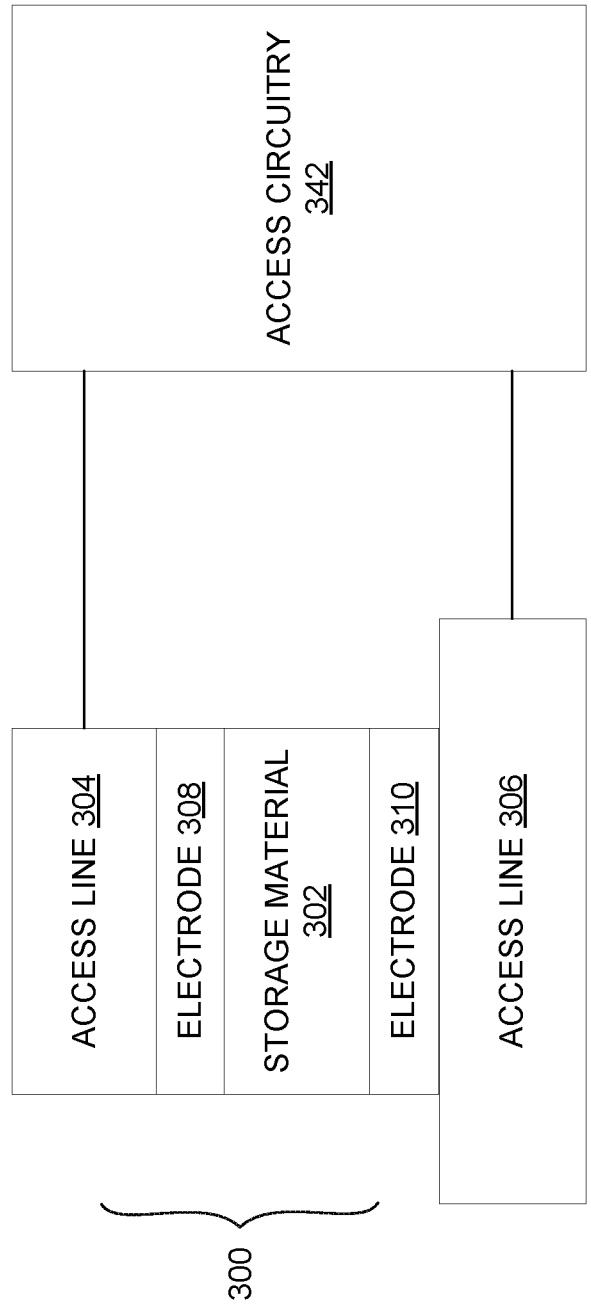
FIG. 3 illustrates a memory cell coupled to access circuitry in accordance with certain embodiments.

FIG. 3 illustrates a memory cell 300 coupled to access circuitry 342 in accordance with certain embodiments. The memory cell 300 includes a storage material 302 between access lines 304 and 306. The access lines 304, 306 electrically couple the memory cell 300 with access circuitry 342 that writes to and reads the memory cell 300. For example, access circuitry 342 may include WL switch circuitry 220, BL switch circuitry 224, sense circuitry 222, or other suitable circuitry.

In one embodiment, storage material 302 includes a self-selecting material that exhibits memory effects. A self-selecting material is a material that enables selection of a memory cell in an array without requiring a separate selector element. Thus, storage material 302 may represent a "selector/storage material." A material exhibits memory effects if circuitry (e.g., 342) for accessing memory cells can cause the material to be in one of multiple states (e.g., via a write operation) and later determine the programmed state (e.g., via a read operation). Access circuitry 342 can store information in the memory cell 300 by causing the storage material 302 to be in a particular state. The storage material 302 can include, for example, a chalcogenide material or other material capable of functioning as both a storage element and a selector, to enable addressing a specific memory cell and determining what the state of the memory cell is. Thus, in one embodiment, the memory cell 300 is a self-selecting memory cell that includes a single layer of material that acts as both a selector element to select the memory cell and a memory element to store a logic state. In the embodiment depicted, each memory cell 300 is a two-terminal device (i.e., the memory cell 300 has two electrodes to receive control signals sufficient to write to and read from the memory cell 300).

In other embodiments, each memory cell (e.g., 300) includes a memory element configured to store information and a separate memory cell select device (e.g., selector) coupled to the memory element. Select devices may include ovonic threshold switches, diodes, bipolar junction transistors, field-effect transistors, etc. In one embodiment, a first chalcogenide layer may comprise the memory element and a second chalcogenide layer may comprise the select device.

The storage material 302 may include any suitable material programmable to a plurality of states. In some embodiments, the storage material 302 may include a chalcogenide material comprising a chemical compound with at least one chalcogen ion, that is, an element from group 16 of the periodic table. For example, the storage material 302 may include one or more of: sulfur (S), selenium (Se), or tellurium (Te). Additionally or alternatively, in various embodiments, storage material 302 may comprise germanium (Ge), antimony (Sb), bismuth (Bi), lead (Pb), tin (Sn), indium (In), silver (Ag), arsenic (As), phosphorus (P), molybdenum (Mo), gallium (Ga), aluminum (Al), oxygen (O), nitrogen (N), chromium (Cr), gold (Au), niobium (Nb), palladium (Pd), cobalt (Co), vanadium (V), nickel (Ni), platinum (Pt), titanium (Ti), tungsten (W), tantalum (Ta), or other materials. In various examples, the storage material 302 may include one or more chalcogenide materials such as such as Te—Se, Ge—Te, In—Se, Sb—Te, Ta—Sb—Te, As—Te, As—Se, Al—Te, As—Se—Te, Ge—Sb—Te, Ge—As—Se, Te—Ge—As, V—Sb—Se, Nb—Sb—Se, In—Sb—Te, In—Se—Te, Te—Sn—Se, V—Sb—Te, Se—Te—Sn, Ge—Se—Ga, Mo—Sb—Se, Cr—Sb—Se, Ta—Sb—Se, Bi—Se—Sb, Mo—Sb—Te, Ge—Bi—Te, W—Sb—Se, Ga—Se—Te, Ge—Te—Se, Cr—Sb—Te, Sn—Sb—Te, W—Sb—Te, As—Sb—Te, Ge—Te—Ti, Te—Ge—Sb—S, Te—Ge—Sn—0, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Se—Te—In, As—Ge—Sb—Te, Se—As—Ge—In, Ge—Sb—Se—Te, Ge—Sn—Sb—Te, Ge—Te—Sn—Ni, Ge—Te—Sn—Pd, and Ge—Te—Sn—Pt, Si—Ge—As—Se, In—Sn—Sb—Te, Ge—Se—Te—Si, Si—Te—As—Ge, Ag—In—Sb—Te, Ge—Se—Te—In—Si, or Se—As—Ge—Si—In. In other various examples, storage material 302 may include other materials capable of being programmed to one of multiple states, such as Ge—Sb, Ga—Sb, In—Sb, Sn—Sb—Bi, or In—Sb—Ge. One or more elements in a chalcogenide material (or other material used as storage material 302) may be dopants. For example, the storage material 302 may include dopants such as: aluminum (Al), oxygen (O), nitrogen (N), silicon (Si), carbon (C), boron (B), zirconium (Zr), hafnium (Hf), or a combination thereof. In some embodiments, the chalcogenide material (or other material used as storage material 302) may include additional elements such as hydrogen (H), oxygen (O), nitrogen (N), chlorine (Cl), or fluorine (F), each in atomic or molecular forms. The storage material 302 may include other materials or dopants not explicitly listed. In some examples, the storage material (such as any of the materials described above) is a phase change material. In other examples, the storage material 302 is not a phase change material, e.g., can be in one or multiple stable states (or transition between stable states) without a change in phase.

In some embodiments, a selector element coupled to storage material (e.g., in non-self-selecting memory cells) may also include a chalcogenide material. A selector device having a chalcogenide material can sometimes be referred to as an Ovonic Threshold Switch (OTS). An OTS may include a chalcogenide composition including any one of the chalcogenide alloy systems described above for the storage element and may further include an element that can suppress crystallization, such as arsenic (As), nitrogen (N), or carbon (C), to name a few. Examples of OTS materials include Te—As—Ge—Si, Ge—Te—Pb, Ge—Se—Te, Al—As—Te, Se—As—Ge—Si, Se—As—Ge—C, Se—Te—Ge—Si, Ge—Sb—Te—Se, Ge—Bi—Te—Se, Ge—As—Sb—Se, Ge—As—Bi—Te, and Ge—As—Bi—Se, among others.

In some embodiments, an element from column III of the periodic table ("Group III element") may be introduced into a chalcogenide material composition to limit the presence of another material (e.g., Ge) in the selector device. For example, a Group III element may replace some or all of the other material (e.g., Ge) in the composition of the selector device. In some embodiments, a Group III element may form a stable, Group III element-centered tetrahedral bond structure with other elements (e.g., Se, As, and/or Si). Incorporating a Group III element into the chalcogenide material composition may stabilize the selector device to allow for technology scaling and increased cross point technology development (e.g., three-dimensional cross point architectures, RAM deployments, storage deployments, or the like).

In one embodiment, each selector device comprises a chalcogenide material having a composition of Se, As, and at least one of B, Al, Ga, In, and Tl. In some cases, the composition of the chalcogenide material comprises Ge or Si, or both.

In one example, the storage material is capable of switching between two or more stable states without changing phase (in other examples the storage material may switch between two stable states by changing phase). In one such embodiment, the access circuitry 342 programs the memory cell 300 by applying one or more program pulses (e.g., voltage or current pulses) with a particular polarity to cause the storage material 302 to be in the desired stable state. In one embodiment, the access circuitry 342 applies program pulses to the access lines 304, 306 (which may correspond to a bitline and a wordline) to write to or read the memory cell 300. In one embodiment, to write to the memory cell 300, the access circuitry applies one or more program pulses with particular magnitudes, polarities, and pulse widths to the access lines 304, 306 to program the memory cell 300 to the desired stable state, which can both select memory cell 300 and program memory cell 300. In various embodiments below, programming states are depicted as being associated with a single programming pulse, however, the single programming pulse may also be equivalent to a series of programming pulses that have the effective characteristics of the single programming pulse (e.g., a width of the single programming pulse may be equivalent to the sum of the widths of a series of shorter programming pulses).

In one embodiment, programming the memory cell 300 causes the memory cell 300 to "threshold" or undergo a "threshold event." When a memory cell thresholds (e.g., during application of a program pulse), the memory cell undergoes a physical change that causes the memory cell to exhibit a certain threshold voltage in response to the application of a subsequent voltage (e.g., through application of a read pulse with a particular voltage magnitude and polarity). Programming the memory cell 300 can therefore involve applying a program pulse of a given polarity to induce a programming threshold event and application of current for a duration of time, which causes the memory cell 300 to exhibit a particular threshold voltage at a subsequent reading voltage of a same or different polarity. In one such embodiment, the storage material 302 is a self-selecting material that can be programmed by inducing a threshold event.

During a read operation, access circuitry 342 may determine a threshold voltage of a memory cell based on electrical responses to a read voltage applied to the memory cell. Detecting electrical responses can include, for example, detecting a voltage drop (e.g., a threshold voltage) across terminals of a given memory cell of the array or current through the given memory cell. In some cases, detecting a threshold voltage for a memory cell can include determining that the cell's threshold voltage is lower than or higher than a reference voltage, for example a read voltage. The access circuitry 342 can determine the logic state of the memory cell 300 based on the electrical response of the memory cell to the read voltage pulse.

As mentioned above, the access lines 304, 306 electrically couple the memory cell 300 with circuitry 342. The access lines 304, 306 can be referred to as a bitline and wordline, respectively. The wordline is for accessing a particular word in a memory array and the bitline is for accessing a particular bit in the word. The access lines 304, 306 can be composed of one or more metals including: Al, Cu, Ni, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicide nitrides including TiSiN and WSiN; conductive metal carbide nitrides including TiCN and WCN, or any other suitable electrically conductive material.

In one embodiment, electrodes 308 are disposed between storage material 302 and access lines 304, 306. Electrodes 308 electrically couple access lines 304, 306 to storage material 302. Electrodes 308 can be composed of one or more conductive and/or semiconductive materials such as, for example: carbon (C), carbon nitride ($C_xN_y$); n-doped polysilicon and p-doped polysilicon; metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN; conductive metal oxides including $RuO_2$, or other suitable conductive materials. In one embodiment, conductive wordline layer can include any suitable metal including, for example, metals including, Al, Cu, Ni, Mo, Cr, Co, Ru, Rh, Pd, Ag, Pt, Au, Ir, Ta, and W; conductive metal nitrides including TiN, TaN, WN, and TaCN; conductive metal silicides including tantalum silicides, tungsten silicides, nickel silicides, cobalt silicides and titanium silicides; conductive metal silicides nitrides including TiSiN and WSiN; conductive metal carbide nitrides including TiCN and WCN, or another suitable electrically conductive material.

The memory cell 300 is one example of a memory cell that may be used as a multi-level cell (storing more than a single logical bit). Other embodiments can include memory cells having additional or different layers of material than illustrated in FIG. 3 (e.g., a selection device between the access line 304 and the storage element, a thin dielectric material between the storage material and access lines, or other suitable configuration).

Figure 4:
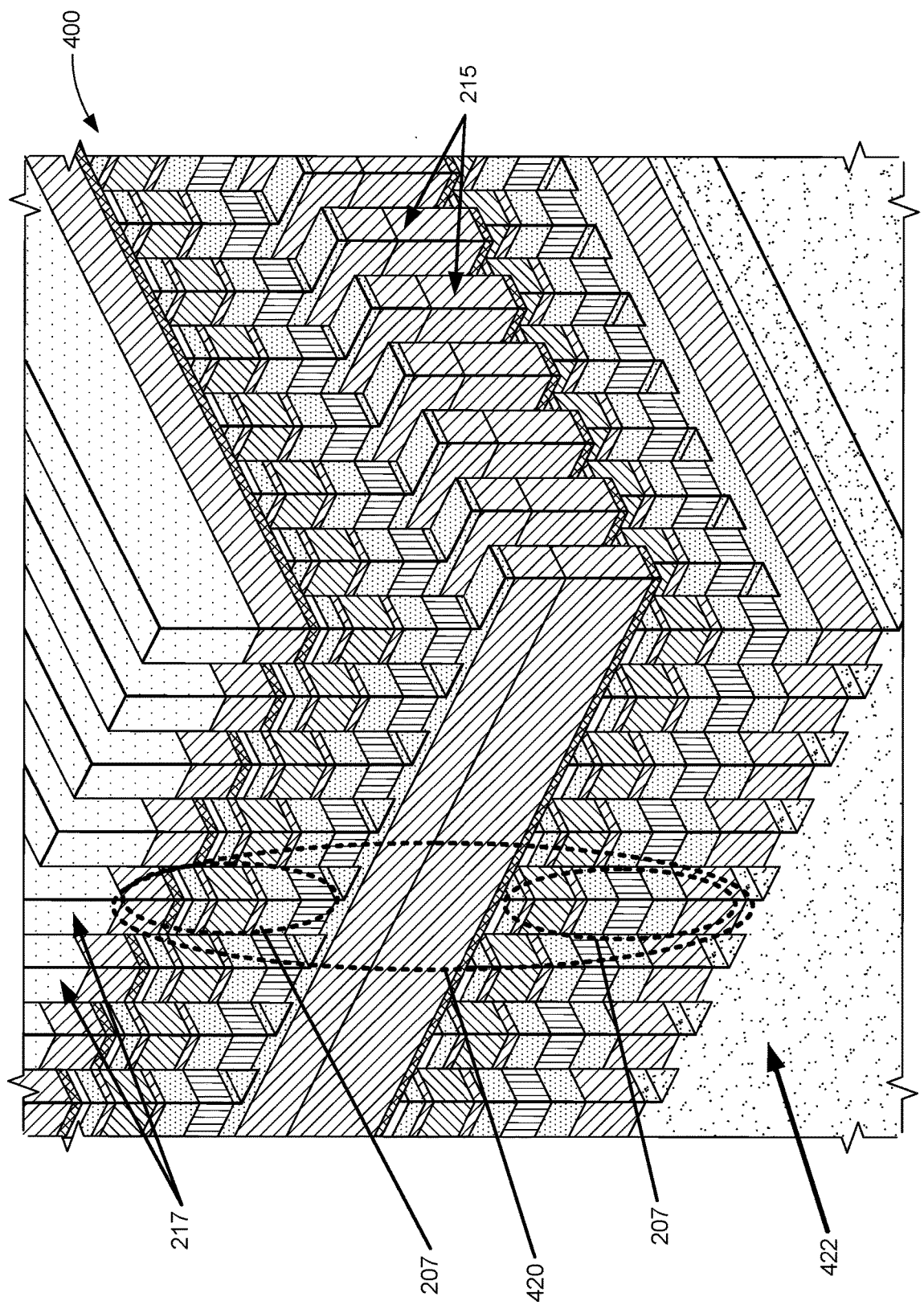
FIG. 4 is a perspective view of portions of a three-dimensional (3D) crosspoint memory stack according to one embodiment.

FIG. 4 is an isometric view of portions of a 3D crosspoint memory stack according to one embodiment. The specific layers are merely examples and will not be described in detail here. Stack 400 is built on substrate structure 422, such as silicon or other semiconductor. Stack 400 includes multiple pillars 420 as memory cell stacks of memory cells 207 or 300. In the diagram of stack 400, it will be observed that the WLs and BLs are orthogonal to each other, and traverse or cross each other in a cross-hatch pattern. A crosspoint memory structure includes at least one memory cell in a stack between layers of BL and WL. As illustrated, wordlines (WL) 215 are in between layers of elements, and bitlines (BL) 217 are located at the top of the circuit. Such a configuration is only an example, and the BL and WL structure can be swapped. Thus, in one representation of stack 400, the WLs can be the metal structures labeled as 217, and the BLs can be the metal structures labeled as 215. Different architectures can use different numbers of stacks of devices, and different configuration of WLs and BLs. It will be understood that the space between pillars 420 is typically an insulator.

Substrate structure 422, such as a silicon substrate, may include control circuitry therein (not shown), such as control circuitry including transistors, row decoders, page buffers, etc. The control circuitry of substrate structure 422 may include, for example, a memory partition controller such as memory partition controller 210, BL control logic such as BL control logic 216, and WL control logic such as WL control logic 214 of FIG. 2, access circuitry 342, or other suitable control circuitry. Each row of WLs 215 extending in the Y direction, the corresponding cells as coupled to corresponding BLs, would define a memory array, and may correspond to a memory array such as memory array 206 of FIG. 2.

Referring now to FIG. 5, in one embodiment, a computer system 500 includes a microcontroller 502 connected to several memory dies 504. Each memory die 504 includes a chip controller 506 and several partitions 508. Each chip controller 506 includes a buffer 510, a read controller 512, and a write controller 514. In the illustrative embodiment, the microcontroller 502 is connected to the memory die by a command bus 516 and a data bus 518.

The microcontroller 502 may be any suitable microcontroller, such as a stand-alone microcontroller or a microcontroller 502 integrated into another component. For example, the microcontroller 502 may be included in the CPU memory controller 112, the storage device controller 118, a system memory device 107, etc. The microcontroller 502 may be implemented as hardware, software, firmware, or a combination thereof. In some embodiments, the microcontroller 502 may be embodied as circuitry or collection of electrical devices.

The memory die 504 may be any suitable memory die or chip, such as the memory chip 116 described above. In the illustrative embodiment, the memory die 504 is a phase-change-based memory die. The chip controller 506 may be any suitable chip controller, such as the chip controller 126. The chip controller 506 may be a stand-alone controller or may be integrated into another component. For example, in the illustrative embodiment, the chip controller 506 is integrated into the memory die 504. In one embodiment, the chip controller 506 may be embodied as the chip controller 126. More generally, some or all of the chip controller 506 may include or be a part of any suitable component. For example, the chip controller 506 may be included in the CPU memory controller 112, the storage device controller 118, a system memory device 107, etc. In some embodiments, some or all of the chip controller 506 may be included in the microcontroller 502. The chip controller 506 may be implemented as hardware, software, firmware, or a combination thereof. In some embodiments, the chip controller 506 may be embodied as circuitry or collection of electrical devices. The partitions 508 in the memory die 504 may be similar to the partitions 122 described above. Each memory die 504 may have any suitable number of partitions 508, such as 4-256 partitions 508. In the illustrative embodiment, each memory die 504 has a minimum average time period between memory write operations, which is greater than the minimum time between consecutive or burst memory operations that can be sent on the command bus 516.

The buffer 510 may be embodied as any suitable volatile or non-volatile memory, such as DRAM, SDRAM, SRAM, etc. In the illustrative embodiment, the buffer 510 can be written faster than the partitions 508 can be written. The buffer 510 may be able to store any suitable number of commands and corresponding data, such as 2-64 commands and data. In the illustrative embodiment, the buffer 510 may be able to store 5-10 commands and corresponding data. In some embodiments, the buffer 510 may be split into a command buffer and a data buffer. In other embodiments, data may be stored in the buffer 510 together with the corresponding command. In the illustrative embodiment, any slot in the buffer 510 may correspond to an operation on any partition 508.

The read controller 512 and the write controller 514 are configured to control read and write operations on the partitions 508, respectively. The read controller 512 and write controller 514 may be implemented as hardware, software, firmware, or a combination thereof. The read controller 512 and/or write controller 512 may be incorporated into or include any other suitable component, such as the microcontroller 502. The read controller 512 may perform a read operation in any suitable amount of time, such as 10-50 nanoseconds.

The command bus 516 and data bus 518 may be any suitable bus, such as a point-to-point interconnect, a serial interconnect, a parallel bus, a differential bus, a Gunning transceiver logic (GTL) bus, etc.

In use, the microcontroller 502 determines memory read and write operations to be sent to the memory dies 504. For example, the microcontroller 502 may receive memory operations from a CPU 102, an external I/O controller 104, a bus, etc. The microcontroller 502 is configured to order memory read and write operations in a manner that lead to a high efficiency in memory operations. In the illustrative embodiment, in order to send a memory operation to a memory die 504, the microcontroller 502 must perform a rank switching operation, which may involve sending a preamble, performing on-die termination, synchronizing a delay-locked loop and/or phase interpolator, etc. The rank switching operation may take several clock cycles, such as 2-10 clock cycles, of a clock signal of the microcontroller 502. In the illustrative embodiment, rank switching takes up to 5 clock cycles. The clock corresponding to the clock cycles could have any suitable frequency, such as 50 megahertz to 2 gigahertz. The illustrative microcontroller 502 can send data to only one memory die 504 at a time.

In order to avoid the penalty imposed by rank switching, the microcontroller 502 performs several operations with one die 504 before switching to another die 504. The microcontroller 502 may send any suitable number of read and write operations to different partitions 508 in any suitable order. However, as discussed in more detail below in regard to the chip controller 506, multiple consecutive memory write operations may need to be buffered on the buffer 510 before being completed. As such, the microcontroller 502 may ensure that the number of write operations sent in any given period of time will not overflow the buffer 510. For example, the microcontroller 502 may have a counter that tracks the number of operations stored in the buffer 510 at any given time. The microcontroller 502 can increment to the counter every time it sends an operation to the memory die 504 and decrement the counter every time the memory die 504 performs a write operation, which, in the illustrative embodiment, are performed in a deterministic manner. The microcontroller 502 may determine a maximum number of consecutive memory write operations that the memory die 504 can handle. As the memory die 504 can perform memory write operations at the same time it is receiving them (albeit at a slower rate), the maximum number of consecutive memory writes may be more than the number of write operations that can be stored in the buffer 510. As discussed in more detail below, in the illustrative embodiment, the memory die 504 can interleave read and write operations to different partitions 508 on the same die 504. As such, the illustrative microcontroller 502 does not need to be concerned about ordering or interleaving of read operations to different partitions 508.

In the illustrative embodiment, there is a minimum delay between a write operation to a partition 508 and a read operation from the same partition 508. The delay may be any suitable value, such as 100-1,000 clock cycles. For example, in one embodiment, the delay is 602 clock cycles. It should be appreciated that the delay should be between the write operation to the partition 508, which may be delayed relative to the write operation sent over the command bus 516 for write operations that are stored in the buffer 510 before execution. In the illustrative embodiment, the microcontroller 502 keeps track of when each write operation will be performed to each partition 508 and ensures that a read operation for that partition 508 will not be sent to the memory die 504 until after the minimum delay period has passed. In other embodiments, the microcontroller 502 may send read operations, and the chip controller 506 may delay the read operations until the minimum delay period has passed.

In the illustrative embodiment, the microcontroller 502 will never send a write operation to the chip controller 506 that will overflow the buffer 510. In some embodiments, the microcontroller 502 may send a write operation that can overflow the buffer 510, and the chip controller 506 can discard such an operation and, optionally, send an error to the microcontroller 502 to notify it of the buffer overflow.

In the illustrative embodiment, the microcontroller 502 sends commands over a command bus 516, and the microcontroller 502 sends and receives data over a data bus 518. In the illustrative embodiment, a fixed time after a command is sent on the command bus 516, data corresponding to the command is sent on the data bus 518. For example, a fixed time after the microcontroller 502 sends a read command to the memory die 504 on the command bus 516, the memory die 504 sends the read data to the microcontroller 502 on the data bus 518. Similarly, a fixed time after the microcontroller 502 sends a write command to the memory die 504 on the command bus 516, the microcontroller 502 sends the write data to the die 504 on the data bus 518.

In the illustrative embodiment, each command on the command bus takes the same amount of time. Each command may take any suitable amount of time, such as 1-16 clock cycles. In the illustrative embodiment, each command takes 8 clock cycles. In the illustrative embodiment, the slot for data transfer on the data bus 518 corresponding to each command on the command bus 516 is the same or less time than the corresponding command on the command bus 516, thus allowing the data bus 518 to always provide data for the corresponding command on the command bus 516. The data bus 518 may transfer any suitable amount of data for a given command, such as 2-32 bytes of data.

The chip controller 506 is configured to receive and process commands from the microcontroller 502. In the illustrative embodiment, the chip controller 506 can pass read commands to the read controller 512, which can perform reads on one or more partitions 508 without conflict with write operations performed on other partitions 508. For example, a read controller 412 can perform a read operation on a partition 508 simultaneously with a write operation on a different partition 508. The read controller 512 can then pass the read data back on the data bus 518 at the appropriate time.

For write operations, the chip controller 506 can check if the write buffer 510 is empty. If it is, then the chip controller 506 can give the write command to the write controller 514, which can perform a write operation immediately (as long as the minimum amount of time has passed since the last write operation). If the write buffer 510 is not empty, then the chip controller 506 adds the write command to the buffer 510. In the illustrative embodiment, the microcontroller 502 should ensure that there is always room in the write buffer 510 for any write operations sent to the memory die 504. In other embodiments, the chip controller 506 may receive a write operation while the buffer 510 is full. In such embodiments, the chip controller 506 may, e.g., discard the new write operation, discard a previous write operation, send an error message to the microcontroller 502, set an error flag, etc.

The write controller 514 is configured to process write commands. When the write controller 514 receives a write command (or retrieves a write command from the buffer), the write controller 514 checks if enough time has passed since the previous write operation on the memory die 504. If it has, the write controller 514 performs the write operation on the memory die 504. If it has not, the write controller 514 will wait until it is time to perform the next write operation. The write controller 514 may perform a write operation in any suitable amount of time, such as 200-1,000 nanoseconds.

In the illustrative embodiment, each write operation to the partitions 508 on a memory die 504 is separated by the same amount of time as one command on the command bus 516. For example, each command on the command bus 516 may take 8 clock cycles, and the time between consecutive memory write operations to the partitions 508 may be 16 clock cycles. As such, on average, every other command on the command bus 516 can be a write command. More generally, the amount of time between consecutive memory write operations to the partitions 508 can be any suitable amount of time, such as 2-128 clock cycles. That amount of time between consecutive write operations represents the no-gap command issuance to the same rank or die. As the memory die 504 can store write operations in the buffer 510, consecutive write commands on the command bus 516 can be sent without any gap between them (e.g., if each command takes 8 clock cycles, the time from starting one write command to the next can be 8 clock cycles).

Figure 6:
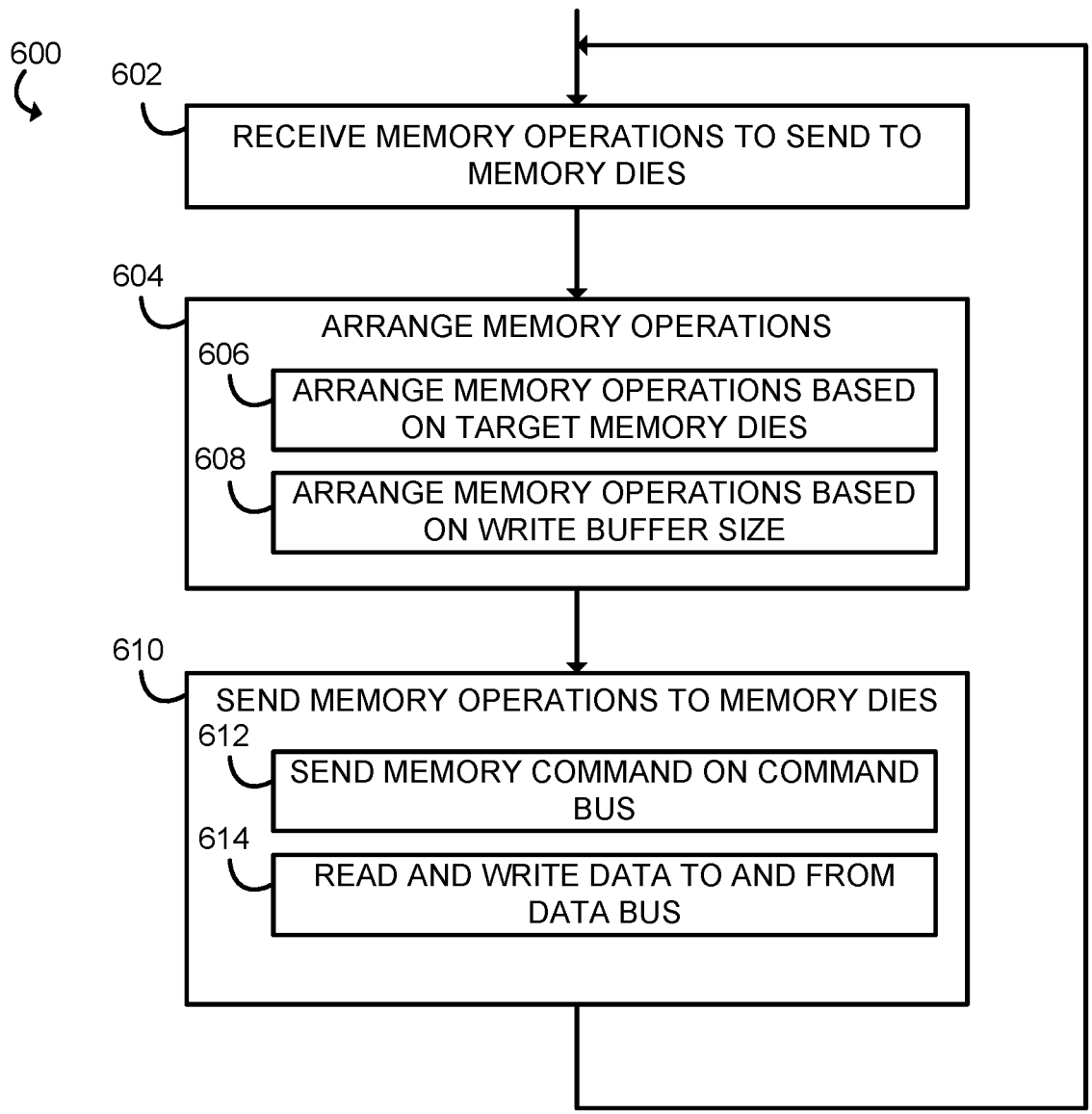
FIG. 6 is a simplified flow diagram of at least one embodiment of a method for controlling memory operations sent to a memory die.

Referring now to FIG. 6, in use, a microcontroller 502 may perform a method 600 for controlling memory operations. The method 600 begins in block 602, in which the microcontroller 502 receives memory operations to send to one or more memory dies 504. The microcontroller 502 may receive memory operations from a CPU 102, an external I/O controller 104, a bus, etc.

In block 604, the microcontroller 502 arranges the received memory operations. The microcontroller 502 is configured to order memory read and write operations in a manner that lead to a high efficiency in memory operations. In the illustrative embodiment, in order to avoid the penalty imposed by rank switching, the microcontroller 502 arranges the memory operations so that there will be several operations with one die 504 before switching to another die 504 in block 606. The microcontroller 502 may send any suitable number of read and write operations to different partitions 508 in any suitable order. However, as discussed above, multiple consecutive memory write operations may need to be buffered on the buffer 510 before being completed. As such, the microcontroller 502 arrange memory operations based on the size and space available in the buffer 510 of the target memory dies 504 in block 608. For example, the microcontroller 502 may have a counter that tracks the number of operations that are (or, for future operations being ordered, will be) stored in the buffer 510 at any given time. The microcontroller 502 can increment to the counter every time it sends an operation to the memory die 504 and decrement the counter every time the memory die 504 performs a write operation, which, in the illustrative embodiment, are performed in a deterministic manner.

In block 610, the microcontroller 502 sends memory operations to the memory dies 504. In the illustrative embodiment, the microcontroller 502 sends a memory command on a command bus 516 to a memory die 504 in block 612. A predefined time later, the microcontroller 502 reads data from (for a read command) or writes data to (for a write command) the data bus 518 connected to the memory die 504. The method 600 loops back to block 602 to receive additional memory operations to perform.

Figure 7:
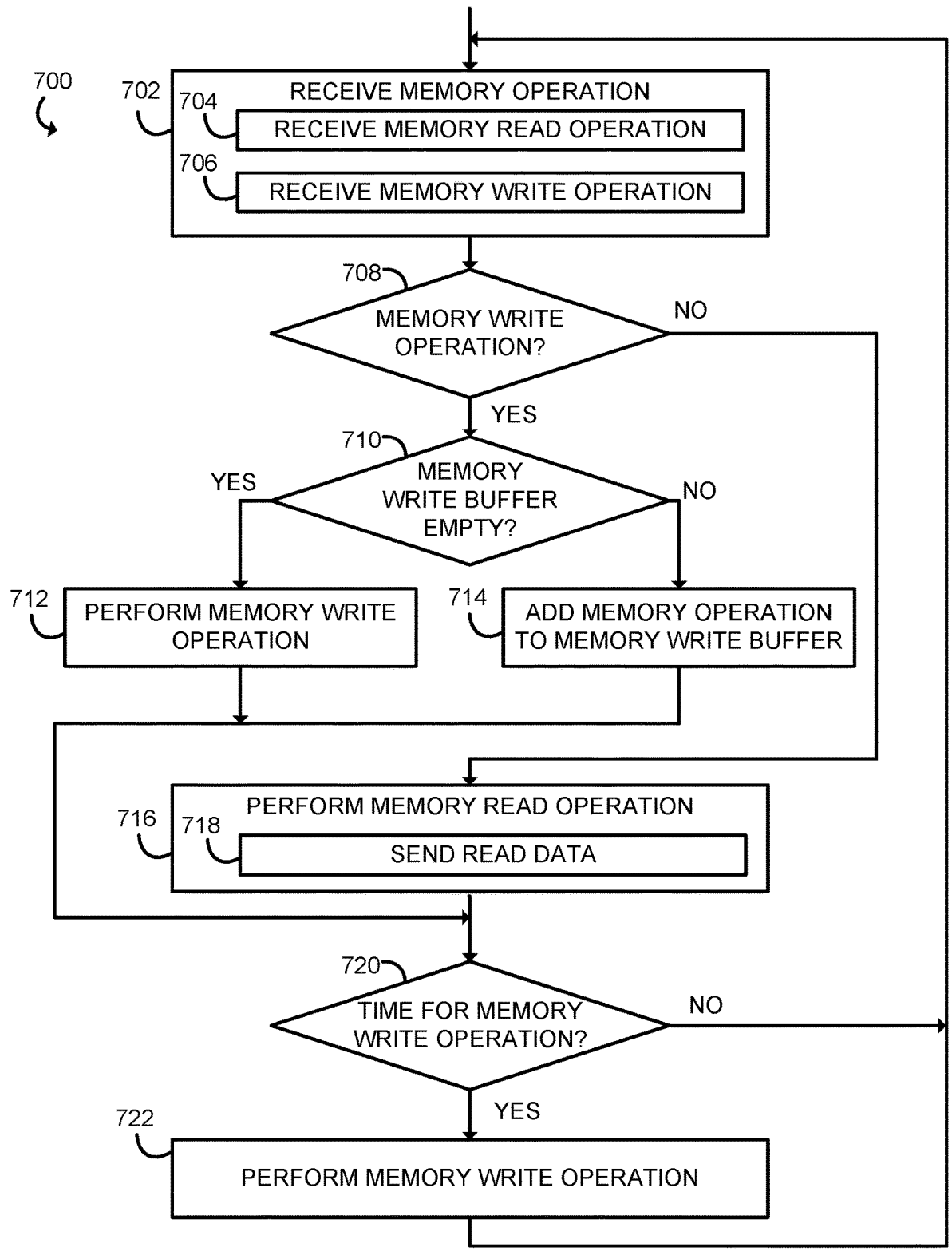
FIG. 7 is a simplified flow diagram of at least one embodiment of a method for performing memory operations in a memory die.

Referring now to FIG. 7, in use, a memory die 504 may perform a method 700 for performing memory operations. The method 700 begins in block 702, in which the memory die 504 receives a memory operation from the microcontroller 502. The memory die 504 may receive a memory read command in block 704 and may receive a memory write command in block 706. In the illustrative embodiment, the memory die 504 receives a memory command on a command bus 516. For a write operation, the memory die 504 receives write data on a data bus 518. In the illustrative embodiment, the memory die 504 may receive the write data on the data bus 518 at a predefined time relative to receiving the write command. In particular, in the illustrative embodiment, the write data is received at the same time relative to a write command as the read data is sent on the data bus relative to a read command (see block 718 below).

In block 708, if the memory operation is a write operation, the method 700 proceeds to block 710. In 710, if the memory write buffer 510 is empty, the method 700 proceeds to block 712 to perform the memory write operation (after receiving the write data on the data bus 518 and if enough time has passed since the last memory write operation).

Referring back to block 710, if the memory write buffer 510 is not empty, the method 700 proceeds to block 714, in which the memory die 504 adds the memory operation to the memory write buffer. When the write data corresponding to the write command is received on the data bus, it is also stored in the buffer 510.

In some embodiments, the memory die 504 always adds incoming write operations to the buffer 510. In such embodiments, the memory die 504 pulls the next write operation from the buffer whenever enough time has passed since the last memory write operation.

Referring back to block 708, if the memory operation is not a memory write operation, the method 700 proceeds to block 716. In block 716, the memory die 504 performs the requested memory read operation. In the illustrative embodiment, the memory die 504 can perform the memory read operation on a partition 508 regardless of whether write operations are in the buffer 510 for other partitions 508. In block 718, the memory die 504 sends the read data on the data bus 518 to the microcontroller 502.

In block 720, the memory die 504 checks if it is time for a memory write operation. The memory die 504 may check if enough time (or clock cycles) has passed since the last memory operation. In the illustrative embodiment, the memory die 504 may check if at least 16 clock cycles have passed. If enough time has passed and there is a write operation in the buffer 510, the memory die 504 performs a memory write operation in block 722. The method 700 then loops back to block 702 to receive another memory operation.

Referring now to FIG. 8, in one embodiment, a timing diagram 800 shows the timing of commands on the command bus 516, data on the data bus 518, and operations performed on the partitions 508, for each of several time slots. It should be appreciated that, in the illustrative embodiment, additional time is needed when the microcontroller 502 performs a rank switch to change from sending operations to one memory die 504 to a second memory die 504. The time for such a rank switch is not included in the timing diagram 800. In practice, each memory operation is not necessarily going to line up with the slots marked in the figure. Rather, the time slots are included merely to show the approximate relative timing of different operations and tasks.

In the timing diagram 800, the microcontroller 502 sends four consecutive memory write commands to a first memory die 504, followed by sending four read commands to the first memory die 504. The microcontroller 502 then sends four consecutive memory write commands to a second memory die 504, followed by sending four read commands to the second memory die 504. As the memory dies 504 have a buffer 510 that can fit at least four memory write operations, each memory die 504 can perform the memory write operations over a period of time. For example, the first memory die 504 can send the first memory write operation to a partition 508 in time slot 0 (at the same time as the write command is received). The partition 508 can perform the write operation as soon as the write data is available. However, the second memory write operation is not sent to the partition 508 until time slot 2, one time slot after it was received, as the memory die 504 needs to wait a minimum amount of time before performing a subsequent write operation. Each of the third and fourth memory write operations are similarly delayed.

The first memory die 504 can perform the read operations simultaneously as the write operations. For example, the third write operation is sent to a partition 508 in time slot 4, at the same time as the first read operation is sent to a different partition 508. The read operations are seamlessly interwoven with the buffered write operations.

After the microcontroller 502 switches to sending operations to the second memory die 504, the first memory die 504 can continue to complete the buffered write operations. For example, in time slot 8, the microcontroller 502 sends a write command to the second memory die 504, but the first memory die 504 is also performing the fourth write operation in a partition 508 at the same time. The write and read operations on the second memory die 504 can be completed in a similar manner as the write and read operations on the first memory die 504.

Referring now to FIG. 9, in one embodiment, a timing diagram 900 shows the timing of commands on the command bus 516, data on the data bus 518, and operations performed on the partitions 508, for each of several time slots. In the timing diagram 900, the microcontroller 502 sends four consecutive memory write commands to a first memory die 504, then sends four consecutive memory write commands to a second memory die 504, then sends four more consecutive memory write commands to the first memory die 504, followed by four more consecutive memory write commands to the second memory die 504. As for the timing diagram 800, the memory write operations to the first memory die 504 are stored in the buffer 510, and the first memory die 504 sends the data to the partitions to be written after the necessary delay. After the microcontroller 502 has partially or fully filled the buffer for the first memory die 504, the microcontroller 502 switches to the second memory die 504. It should be appreciated that the first memory die 504 continues performing write operations while the microcontroller 502 is sending memory write operations to the second memory die 504. For example, in time slot 6, the microcontroller 502 sends a memory write command to the second memory die 504, while the first memory die 504 is performing a memory write operation that was sent to it back in time slot 2.

By the time the microcontroller 502 has sent the fourth write command to the second memory die 504, the first memory die 504 has completed its assigned memory write operations. As such, the microcontroller 502 can switch back to the first memory die 504 and send the memory die 504 additional memory write operations, partially or fully filling up the empty buffer 510 in the memory die 504.

Without a buffer 510 to store memory write operations, the microcontroller 502 may need to either delay consecutive memory writes on the same memory die 504 switch ranks to a different memory die 504 for each of several consecutive memory writes. As such, a penalty of, e.g., five clock cycles may be present between each write operation. By having a relatively small buffer of, e.g., four slots, the microcontroller 502 can perform four consecutive memory write operations without needing to switch ranks (or even more, as the memory die 504 will be processing the buffer 510 as the microcontroller 502 adds more items to the buffer 510, albeit at a slower rate). The buffer with four slots can, therefore, reduce the time lost in rank switching in certain circumstances by over 75%. Larger buffers 510 can further reduce the time lost in rank switching, but the amount of time saved decreases as the size of the buffer 510 increases. As such, a relatively small buffer 510 may be a reasonable compromise between added performance and reduced cost.

Examples

Illustrative examples of the technologies disclosed herein are provided below. An embodiment of the technologies may include any one or more, and any combination of, the examples described below.

Example 1 includes a phase-change-based memory die comprising a plurality of partitions; and a chip controller, the chip controller to receive a first memory write operation at a first time; and receive a second memory write operation at a second time, wherein the phase-change-based memory die has a minimum average time period between write operations, wherein a time between the first time and the second time is less than the minimum average time period between write operations.

Example 2 includes the subject matter of Example 1, and wherein the chip controller is further to send first memory write data corresponding to the first memory write operation to a first partition of the plurality of partitions; store second memory write data corresponding to the second memory write operation in a buffer of the phase-change-based memory die; and send the second memory write data from the buffer to a second partition of the plurality of partitions at least the minimum average time period between write operations after the first memory write data is sent to the first partition.

Example 3 includes the subject matter of any of Examples 1 and 2, and wherein the chip controller is further to receive a memory read operation after the second memory write operation; and send memory read data corresponding to the memory read operation to a third partition of the plurality of partitions before the second memory write data is sent to the second partition.

Example 4 includes the subject matter of any of Examples 1-3, and wherein the chip controller is further to receive a memory read operation after the second memory write operation; and send memory read data corresponding to the memory read operation to a third partition of the plurality of partitions simultaneously with when the second memory write data is sent to the second partition.

Example 5 includes the subject matter of any of Examples 1-4, and wherein the chip controller is further to write the first memory write data to the first partition in less than 500 nanoseconds.

Example 6 includes the subject matter of any of Examples 1-5, and wherein the phase-change-based memory die has 16-128 partitions.

Example 7 includes the subject matter of any of Examples 1-6, and wherein the phase-change-based memory die is on a dual in-line memory module (DIMM).

Example 8 includes the subject matter of any of Examples 1-7, and wherein the phase-change-based memory die is on a storage device.

Example 9 includes the subject matter of any of Examples 1-8, and wherein the phase-change-based memory die has a clock signal between 100 and 500 megahertz, wherein the minimum average time period between write operations is between 12 and 20 clock cycles of the clock signal.

Example 10 includes the subject matter of any of Examples 1-9, and wherein a difference between the first time associated with the first memory write operation and the second time associated with the second memory write operation is between 2 and 10 clock cycles.

Example 11 includes the subject matter of any of Examples 1-10, and wherein the first memory write operation is to write between 4 and 64 byes, wherein the second memory write operation is to write between 4 and 64 bytes.

Example 12 includes a microcontroller comprising circuitry to send a first memory write operation at a first time to a phase-change-based memory die; and send a second memory write operation at a second time to the phase-change-based memory die, wherein a time between the first time and the second time is less than a minimum average time period between write operations of the phase-change-based memory die.

Example 13 includes the subject matter of Example 12, and wherein the circuitry is further to receive a plurality of memory operations to send to a plurality of phase-change-based memory dies, wherein the plurality of phase-change-based memory dies includes the phase-change-based memory die; and arrange the plurality of memory operations to perform a plurality of consecutive memory write operations on the phase-change-based memory die.

Example 14 includes the subject matter of any of Examples 12 and 13, and wherein to arrange the plurality of memory operations to perform the plurality of consecutive memory write operations on the phase-change-based memory die comprises to arrange the plurality of memory operations based on a size of a memory write buffer of the phase-change-based memory die.

Example 15 includes the subject matter of any of Examples 12-14, and wherein a number of operations in the plurality of consecutive memory write operations is equal to a maximum number of consecutive memory write operations of the plurality of phase-change-based memory dies, wherein to arrange the plurality of memory operations comprises arrange the plurality of consecutive memory write operations on the phase-change-based memory die based on the maximum number of consecutive memory write operations; arrange a second plurality of consecutive memory write operations on a second phase-change-based memory die of the plurality of phase-change-based memory dies based on the maximum number of consecutive memory write operations; and arrange a third plurality of consecutive memory write operations on the phase-change-based memory die based on the maximum number of consecutive memory write operations, wherein the second plurality of consecutive memory write operations is immediately after the plurality of consecutive memory write operations, wherein the third plurality of consecutive memory write operations is immediately after the second plurality of consecutive memory write operations.

Example 16 includes the subject matter of any of Examples 12-15, and wherein the phase-change-based memory die is on a dual in-line memory module (DIMM).

Example 17 includes the subject matter of any of Examples 12-16, and wherein the phase-change-based memory die is on a storage device.

Example 18 includes a system comprising a plurality of phase-change-based memory dies, wherein each of the plurality of phase-change-based memory dies has a memory write buffer with a memory write buffer size; and a microcontroller to receive a plurality of memory operations to send to the plurality of phase-change-based memory dies; and arrange the plurality of memory operations based on the memory write buffer size.

Example 19 includes the subject matter of Example 18, and wherein the microcontroller is to arrange the plurality of memory operations to include a plurality of consecutive memory write operations on a phase-change-based memory die of the plurality of phase-change-based memory dies, wherein a number of operations in the plurality of consecutive memory write operations is equal to a maximum number of consecutive memory write operations of the plurality of phase-change-based memory dies.

Example 20 includes the subject matter of any of Examples 18 and 19, and wherein to arrange the plurality of memory operations comprises arrange the plurality of consecutive memory write operations on the phase-change-based memory die based on the maximum number of consecutive memory write operations; arrange a second plurality of consecutive memory write operations on a second phase-change-based memory die of the plurality of phase-change-based memory dies based on the maximum number of consecutive memory write operations; and arrange a third plurality of consecutive memory write operations on the phase-change-based memory die based on the maximum number of consecutive memory write operations, wherein the second plurality of consecutive memory write operations is immediately after the plurality of consecutive memory write operations, wherein the third plurality of consecutive memory write operations is immediately after the second plurality of consecutive memory write operations.

Example 21 includes a method comprising receiving, by a phase-change-based memory die, a first memory write operation at a first time; and receiving, by the phase-change-based memory die, a second memory write operation at a second time, wherein the phase-change-based memory die has a minimum average time period between write operations, wherein a time between the first time and the second time is less than the minimum average time period between write operations.

Example 22 includes the subject matter of Example 21, and further including sending, by the phase-change-based memory die, first memory write data corresponding to the first memory write operation to a first partition of a plurality of partitions of the phase-change-based memory die; storing, by the phase-change-based memory die, second memory write data corresponding to the second memory write operation in a buffer of the phase-change-based memory die; and sending, by the phase-change-based memory die, the second memory write data from the buffer to a second partition of the plurality of partitions at least the minimum average time period between write operations after the first memory write data is sent to the first partition.

Example 23 includes the subject matter of any of Examples 21 and 22, and further including receiving, by the phase-change-based memory die, a memory read operation after the second memory write operation; and sending, by the phase-change-based memory die, memory read data corresponding to the memory read operation to a third partition of the plurality of partitions before the second memory write data is sent to the second partition.

Example 24 includes the subject matter of any of Examples 21-23, and further including receiving, by the phase-change-based memory die, a memory read operation after the second memory write operation; and sending, by the phase-change-based memory die, memory read data corresponding to the memory read operation to a third partition of the plurality of partitions simultaneously with when the second memory write data is sent to the second partition.

Example 25 includes the subject matter of any of Examples 21-24, and further including writing the first memory write data to the first partition in less than 500 nanoseconds.

Example 26 includes the subject matter of any of Examples 21-25, and wherein the phase-change-based memory die has 16-128 partitions.

Example 27 includes the subject matter of any of Examples 21-26, and wherein the phase-change-based memory die is on a dual in-line memory module (DIMM).

Example 28 includes the subject matter of any of Examples 21-27, and wherein the phase-change-based memory die is on a storage device.

Example 29 includes the subject matter of any of Examples 21-28, and wherein the phase-change-based memory die has a clock signal between 100 and 500 megahertz, wherein the minimum average time period between write operations is between 12 and 20 clock cycles of the clock signal.

Example 30 includes the subject matter of any of Examples 21-29, and wherein a difference between the first time associated with the first memory write operation and the second time associated with the second memory write operation is between 2 and 10 clock cycles.

Example 31 includes the subject matter of any of Examples 21-30, and wherein the first memory write operation is to write between 4 and 64 byes, wherein the second memory write operation is to write between 4 and 64 bytes.

Example 32 includes a method comprising sending, by a microcontroller, a first memory write operation at a first time to a phase-change-based memory die; and sending, by the microcontroller, a second memory write operation at a second time to the phase-change-based memory die, wherein a time between the first time and the second time is less than a minimum average time period between write operations of the phase-change-based memory die.

Example 33 includes the subject matter of Example 32, and further including receiving a plurality of memory operations to send to a plurality of phase-change-based memory dies, wherein the plurality of phase-change-based memory dies includes the phase-change-based memory die; and arranging the plurality of memory operations to perform a plurality of consecutive memory write operations on the phase-change-based memory die.

Example 34 includes the subject matter of any of Examples 32 and 33, and wherein arranging the plurality of memory operations to perform the plurality of consecutive memory write operations on the phase-change-based memory die comprises arranging the plurality of memory operations based on a size of a memory write buffer of the phase-change-based memory die.

Example 35 includes the subject matter of any of Examples 32-34, and wherein a number of operations in the plurality of consecutive memory write operations is equal to a maximum number of consecutive memory write operations of the plurality of phase-change-based memory dies, wherein arranging the plurality of memory operations comprises arranging the plurality of consecutive memory write operations on the phase-change-based memory die based on the maximum number of consecutive memory write operations; arranging a second plurality of consecutive memory write operations on a second phase-change-based memory die of the plurality of phase-change-based memory dies based on the maximum number of consecutive memory write operations; and arranging a third plurality of consecutive memory write operations on the phase-change-based memory die based on the maximum number of consecutive memory write operations, wherein the second plurality of consecutive memory write operations is immediately after the plurality of consecutive memory write operations, wherein the third plurality of consecutive memory write operations is immediately after the second plurality of consecutive memory write operations.

Example 36 includes the subject matter of any of Examples 32-35, and wherein the phase-change-based memory die is on a dual in-line memory module (DIMM).

Example 37 includes the subject matter of any of Examples 32-36, and wherein the phase-change-based memory die is on a storage device.

Example 38 includes a phase-change-based memory die comprising means for receiving a first memory write operation at a first time; and means for receiving a second memory write operation at a second time, wherein the phase-change-based memory die has a minimum average time period between write operations, wherein a time between the first time and the second time is less than the minimum average time period between write operations.

Example 39 includes the subject matter of Example 38, and further including means for sending first memory write data corresponding to the first memory write operation to a first partition of a plurality of partitions of the phase-change-based memory die; means for storing second memory write data corresponding to the second memory write operation in a buffer of the phase-change-based memory die; and means for sending the second memory write data from the buffer to a second partition of the plurality of partitions at least the minimum average time period between write operations after the first memory write data is sent to the first partition.

Example 40 includes the subject matter of any of Examples 38 and 39, and further including means for receiving a memory read operation after the second memory write operation; and means for sending memory read data corresponding to the memory read operation to a third partition of the plurality of partitions before the second memory write data is sent to the second partition.

Example 41 includes the subject matter of any of Examples 38-40, and further including means for receiving a memory read operation after the second memory write operation; and means for sending memory read data corresponding to the memory read operation to a third partition of the plurality of partitions simultaneously with when the second memory write data is sent to the second partition.

Example 42 includes the subject matter of any of Examples 38-41, and further including means for writing the first memory write data to the first partition in less than 500 nanoseconds.

Example 43 includes the subject matter of any of Examples 38-42, and wherein the phase-change-based memory die has 16-128 partitions.

Example 44 includes the subject matter of any of Examples 38-43, and wherein the phase-change-based memory die is on a dual in-line memory module (DIMM).

Example 45 includes the subject matter of any of Examples 38-44, and wherein the phase-change-based memory die is on a storage device.

Example 46 includes the subject matter of any of Examples 38-45, and wherein the phase-change-based memory die has a clock signal between 100 and 500 megahertz, wherein the minimum average time period between write operations is between 12 and 20 clock cycles of the clock signal.

Example 47 includes the subject matter of any of Examples 38-46, and wherein a difference between the first time associated with the first memory write operation and the second time associated with the second memory write operation is between 2 and 10 clock cycles.

Example 48 includes the subject matter of any of Examples 38-47, and wherein the first memory write operation is to write between 4 and 64 byes, wherein the second memory write operation is to write between 4 and 64 byes.

Example 49 includes a microcontroller comprising means for sending, by a microcontroller, a first memory write operation at a first time to a phase-change-based memory die; and means for sending a second memory write operation at a second time to the phase-change-based memory die, wherein a time between the first time and the second time is less than a minimum average time period between write operations of the phase-change-based memory die.

Example 50 includes the subject matter of Example 49, and further including means for receiving a plurality of memory operations to send to a plurality of phase-change-based memory dies, wherein the plurality of phase-change-based memory dies includes the phase-change-based memory die; and means for arranging the plurality of memory operations to perform a plurality of consecutive memory write operations on the phase-change-based memory die.

Example 51 includes the subject matter of any of Examples 49 and 50, and wherein the means for arranging the plurality of memory operations to perform the plurality of consecutive memory write operations on the phase-change-based memory die comprises means for arranging the plurality of memory operations based on a size of a memory write buffer of the phase-change-based memory die.

Example 52 includes the subject matter of any of Examples 49-51, and wherein a number of operations in the plurality of consecutive memory write operations is equal to a maximum number of consecutive memory write operations of the plurality of phase-change-based memory dies, wherein the means for arranging the plurality of memory operations comprises means for arranging the plurality of consecutive memory write operations on the phase-change-based memory die based on the maximum number of consecutive memory write operations; means for arranging a second plurality of consecutive memory write operations on a second phase-change-based memory die of the plurality of phase-change-based memory dies based on the maximum number of consecutive memory write operations; and means for arranging a third plurality of consecutive memory write operations on the phase-change-based memory die based on the maximum number of consecutive memory write operations, wherein the second plurality of consecutive memory write operations is immediately after the plurality of consecutive memory write operations, wherein the third plurality of consecutive memory write operations is immediately after the second plurality of consecutive memory write operations.

Example 53 includes the subject matter of any of Examples 49-52, and wherein the phase-change-based memory die is on a dual in-line memory module (DIMM).

Example 54 includes the subject matter of any of Examples 49-53, and wherein the phase-change-based memory die is on a storage device.

The invention claimed is:

1. A phase-change-based memory die comprising:
a plurality of partitions; and
a chip controller, the chip controller to:
receive a first memory write operation at a first time;
receive a second memory write operation at a second time; and
receive a memory read operation after receipt of the second memory write operation,
wherein the phase-change-based memory die has a minimum average time period between write operations,
wherein a time between the first time and the second time is less than the minimum average time period between write operations,
wherein the chip controller is further to:
perform the first memory write operation at a third time;
perform the second memory write operation at a fourth time, wherein a time between the third time and the fourth time is at least the minimum average time period between write operations; and
perform the memory read operation before performance of the second memory write operation.

2. The phase-change-based memory die of claim 1, wherein the chip controller is further to:
send first memory write data corresponding to the first memory write operation to a first partition of the plurality of partitions;
store second memory write data corresponding to the second memory write operation in a buffer of the phase-change-based memory die; and
send the second memory write data from the buffer to a second partition of the plurality of partitions at least the minimum average time period between write operations after the first memory write data is sent to the first partition.

3. The phase-change-based memory die of claim 2, wherein the chip controller is further to:
receive a second memory read operation after the second memory write operation; and
send memory read data corresponding to the second memory read operation to a third partition of the plurality of partitions before the second memory write data is sent to the second partition.

4. The phase-change-based memory die of claim 2, wherein the chip controller is further to:
receive a second memory read operation after the second memory write operation; and
send memory read data corresponding to the second memory read operation to a third partition of the plurality of partitions simultaneously with when the second memory write data is sent to the second partition.

5. The phase-change-based memory die of claim 2, wherein the chip controller is further to write the first memory write data to the first partition in less than 500 nanoseconds.

6. The phase-change-based memory die of claim 1, wherein the phase-change-based memory die has 16-128 partitions.

7. The phase-change-based memory die of claim 1, wherein the phase-change-based memory die is on a dual in-line memory module (DIMM).

8. The phase-change-based memory die of claim 1, wherein the phase-change-based memory die is on a storage device.

9. The phase-change-based memory die of claim 1, wherein the phase-change-based memory die has a clock signal between 100 and 500 megahertz,
wherein the minimum average time period between write operations is between 12 and 20 clock cycles of the clock signal.

10. The phase-change-based memory die of claim 9, wherein a difference between the first time associated with the first memory write operation and the second time associated with the second memory write operation is between 2 and 10 clock cycles.

11. The phase-change-based memory die of claim 1, wherein the first memory write operation is to write between 4 and 64 bytes, wherein the second memory write operation is to write between 4 and 64 bytes.

12. A microcontroller comprising circuitry to:
send a first memory write operation at a first time to a phase-change-based memory die;
send a second memory write operation at a second time to the phase-change-based memory die, wherein a time between the first time and the second time is less than a minimum average time period between write operations of the phase-change-based memory die;
receive a plurality of memory operations to send to a plurality of phase-change-based memory dies, wherein the plurality of phase-change-based memory dies includes the phase-change-based memory die; and
arrange the plurality of memory operations to perform a plurality of consecutive memory write operations on the phase-change-based memory die, wherein to arrange the plurality of memory operations to perform the plurality of consecutive memory write operations on the phase-change-based memory die comprises to reorder the plurality of memory operations based on a size of a memory write buffer of the phase-change-based memory die.

13. The microcontroller of claim 12, wherein a number of operations in the plurality of consecutive memory write operations is equal to a maximum number of consecutive memory write operations of the plurality of phase-change-based memory dies,
wherein to arrange the plurality of memory operations comprises to:
temporally arrange the plurality of consecutive memory write operations on the phase-change-based memory die based on the maximum number of consecutive memory write operations;
temporally arrange a second plurality of consecutive memory write operations on a second phase-change-based memory die of the plurality of phase-change-based memory dies based on the maximum number of consecutive memory write operations; and
arrange a third plurality of consecutive memory write operations on the phase-change-based memory die based on the maximum number of consecutive memory write operations,
wherein the second plurality of consecutive memory write operations is immediately after the plurality of consecutive memory write operations,
wherein the third plurality of consecutive memory write operations is immediately after the second plurality of consecutive memory write operations.

14. The microcontroller of claim 12, wherein the phase-change-based memory die is on a dual in-line memory module (DIMM).

15. The microcontroller of claim 12, wherein the phase-change-based memory die is on a storage device.

16. A system comprising:
a plurality of phase-change-based memory dies, wherein each of the plurality of phase-change-based memory dies has a memory write buffer with a memory write buffer size; and
a microcontroller to:
receive a plurality of memory operations to send to the plurality of phase-change-based memory dies; and
reorder the plurality of memory operations based on the memory write buffer size,
wherein the microcontroller is to arrange the plurality of memory operations to include a plurality of consecutive memory write operations on a phase-change-based memory die of the plurality of phase-change-based memory dies,
wherein a number of operations in the plurality of consecutive memory write operations is equal to a maximum number of consecutive memory write operations of the plurality of phase-change-based memory dies,
wherein to reorder the plurality of memory operations comprises to:
arrange the plurality of consecutive memory write operations on the phase-change-based memory die based on the maximum number of consecutive memory write operations;
arrange a second plurality of consecutive memory write operations on a second phase-change-based memory die of the plurality of phase-change-based memory dies based on the maximum number of consecutive memory write operations; and
arrange a third plurality of consecutive memory write operations on the phase-change-based memory die based on the maximum number of consecutive memory write operations,
wherein the second plurality of consecutive memory write operations is immediately after the plurality of consecutive memory write operations,
wherein the third plurality of consecutive memory write operations is immediately after the second plurality of consecutive memory write operations.

17. The system of claim 16, wherein the microcontroller is to write memory write data to a partition in less than 500 nanoseconds.

18. The system of claim 16, wherein individual phase-change-based memory dies of the plurality of phase-change-based memory dies have 16-128 partitions.

19. The system of claim 16, wherein individual phase-change-based memory dies of the plurality of phase-change-based memory dies are on a dual in-line memory module (DIMM).

20. The system of claim 16, wherein individual phase-change-based memory dies of the plurality of phase-change-based memory dies are on a storage device.

* * * * *